US012687471B2

(12) United States Patent
Agarwal et al.

(10) Patent No.: US 12,687,471 B2
(45) Date of Patent: Jul. 21, 2026

(54) ACOUSTIC EMISSION-BASED INDENTATION DEFORMATION MONITORING SYSTEM FOR INDENTATION PLASTOMETRY

(71) Applicants: Arvind Agarwal, Miami, FL (US); Sarvesha Rajashekara, Miami, FL (US); Gonzalo Seisdedos Rodriguez, Miami, FL (US)

(72) Inventors: Arvind Agarwal, Miami, FL (US); Sarvesha Rajashekara, Miami, FL (US); Gonzalo Seisdedos Rodriguez, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 35 days.

Patent file contains an affidavit/declaration under 37 CFR 1.130(b).

(21) Appl. No.: 18/896,326

(22) Filed: Sep. 25, 2024

(65) Prior Publication Data

US 2026/0086006 A1     Mar. 26, 2026

(51) Int. Cl.
*G01N 3/06*          (2006.01)
*G01N 3/42*          (2006.01)

(52) U.S. Cl.
CPC ................ *G01N 3/06* (2013.01); *G01N 3/42* (2013.01); *G01N 2203/0078* (2013.01); *G01N 2203/0658* (2013.01)

(58) Field of Classification Search
CPC .... G01N 3/06; G01N 3/42; G01N 2203/0078; G01N 2203/0658
See application file for complete search history.

(56) References Cited

U.S. PATENT DOCUMENTS

| | | | | |
|---|---|---|---|---|
| 11,041,791 B2 * | 6/2021 | Hamaki | .................. | C01B 32/26 |
| 11,275,007 B1 * | 3/2022 | Agarwal | ............... | G01N 3/068 |
| 11,346,857 B1 * | 5/2022 | Daugela | .................. | G01N 29/46 |
| 11,683,597 B1 * | 6/2023 | Agarwal | ............. | H04N 13/204 |
| | | | | 382/128 |
| 11,998,958 B2 * | 6/2024 | Dhau | ...................... | B08B 7/005 |
| 2007/0151340 A1 * | 7/2007 | Hsu | ......................... | G01N 29/46 |
| | | | | 702/56 |
| 2019/0293536 A1 * | 9/2019 | Hamaki | .................. | C01B 32/26 |
| 2020/0179992 A1 * | 6/2020 | Dhau | ...................... | B08B 13/00 |
| 2025/0237588 A1 * | 7/2025 | Clyne | ...................... | G01N 3/44 |
| 2025/0314571 A1 * | 10/2025 | Ma | ......................... | G01N 3/068 |

* cited by examiner

*Primary Examiner* — Freddie Kirkland, III
(74) *Attorney, Agent, or Firm* — SALIWANCHIK, LLOYD & EISENSCHENK

(57)          ABSTRACT

Systems and methods are provided for acquisition of acoustic emission during indentation. An acoustic transducer can be used during indentation of a sample to acquire AE and capture valuable information concerning internal structural changes occurring within the material of the sample during the indentation process. This can help determine and/or understand the deformation characteristics and/or bulk plastic properties of the material of the sample. The transducer can be either a contact type acoustic transducer or a non-contact type acoustic transducer.

18 Claims, 11 Drawing Sheets

ACOUSTIC EMISSION-BASED INDENTATION DEFORMATION MONITORING SYSTEM FOR INDENTATION PLASTOMETRY

GOVERNMENT SUPPORT

This invention was made with government support under W911NF-20-2-0256 awarded by the Army Research Laboratory—Army Research Office. The government has certain rights in the invention.

BACKGROUND

Profilometer-based indentation plastometry (PIP) offers a means to obtain some properties of metals through indentation. However, the PIP techniques have limitations and do not provide the full picture of material properties.

BRIEF SUMMARY

Embodiments of the subject invention provide novel and advantageous systems and methods for acquisition of acoustic emission during indentation. An acoustic transducer can be used during indentation of a sample to acquire acoustic emission (AE) and capture valuable information concerning internal structural changes occurring within the material of the sample during the indentation process. This can help determine and/or understand the deformation characteristics and/or bulk plastic properties of the material of the sample. The transducer can be either a contact type acoustic transducer or a non-contact type acoustic transducer.

In an embodiment, a system for acquisition of AE of a sample during indentation can comprise: an indenter device (e.g., a profilometer-based indentation plastometry (PIP) indenter device) comprising an indenter and a sample platform configured to have the sample disposed thereon; and an acoustic transducer disposed proximate (e.g., within 300 millimeters (mm) or less, such as within 200 mm or less, within 100 mm or less, within 50 mm or less, within 25 mm or less, or about 25 mm) to the sample platform and configured to acquire AE in real time (i.e., as the material of the sample is being deformed while the indentation is occurring) from the sample during indentation of the sample by the indenter device. The acoustic transducer can be a non-contact type acoustic transducer (e.g., a transducer that is or comprises an ultrasonic transducer, a microphone, and/or a headphone) configured to acquire the AE from the sample without being in physical contact with the sample or the sample platform (e.g., during the indenting of the sample). The acoustic transducer can alternatively be a contact type acoustic transducer configured to acquire the AE from the sample while being in physical contact, during the indenting of the sample, with at least one of the sample, the sample platform, and an indenter housing (which supports a tip of the indenter). The sample can comprise, for example, a metallic material (e.g., a metal or a metal alloy), a ceramic material, and/or a polymer-based material (e.g., a polymer or a polymer-based composite). The system can further comprise a data acquisition system in operable communication with the acoustic transducer and configured to analyze the AE and/or generate AE data based on the AE. The system can further comprise a display in operable communication with the data acquisition system and/or the acoustic transducer, and the display can be configured to display the AE data. The system can further comprise a soundproof box, and the indenter device and the acoustic transducer can be disposed within the soundproof box (e.g., during indentation).

In another embodiment, a method for acquiring AE of a sample during indentation can comprise: providing a system comprising any or all of the features discussed in the previous paragraph (e.g., comprising an indenter device (e.g., a PIP indenter device) and an acoustic transducer disposed proximate to a sample platform of the indenter device); disposing the sample on the sample platform of the indenter device; operating the indenter device such that an indenter of the indenter device indents the sample; and acquiring AE in real time from the sample, using the acoustic transducer, during the indenting of the sample. The acoustic transducer can be a non-contact type acoustic transducer, and the acoustic transducer can acquire the AE from the sample without being in physical contact with the sample or the sample platform (e.g., during the indenting of the sample). Alternatively, the acoustic transducer can be a contact type acoustic transducer, and the acoustic transducer can acquire the AE from the sample while being in physical contact, during the indenting of the sample, with at least one of the sample, the sample platform, and an indenter housing (which supports a tip of the indenter). The sample can comprise, for example, a metallic material (e.g., a metal or a metal alloy), a ceramic material, and/or a polymer-based material (e.g., a polymer or a polymer-based composite). The method can further comprise: providing a data acquisition system in operable communication with the acoustic transducer; providing a display in operable communication with the data acquisition system; analyzing the AE using the data acquisition system; generating the AE data based on the AE using the data acquisition system; and/or displaying the AE data on the display. The method can further comprise disposing the indenter device and the acoustic transducer in a soundproof box, and the operating of the indenter device and the acquiring of the AE can be performed while the indenter device and the acoustic transducer are in the soundproof box.

BRIEF DESCRIPTION OF DRAWINGS

FIG. 6*a* shows a plot of load (in Newtons (N)) versus displacement (in micrometers (μm)) for a wire-arc additive manufactured titanium (Ti) sample. The arrows indicate pop-in.

FIG. 6*b* shows a plot of amplitude (in Volts (V)) versus time (in seconds (s)), showing raw acoustic data captured through a contact type transducer with the transducer attached to the sample (from FIG. 6*a*).

FIG. 6*c* shows a graph of frequency (in Hertz (Hz); left vertical axis) and amplitude (right vertical axis) versus time (in s), for an acoustic signal from the sample of FIG. 6*a*.

FIG. 6*d* shows an enlarged version of the dotted box from FIG. 6*c*. The upper arrow indicates a long frequency range peak, and the lower five arrows indicate short frequency range peaks.

FIG. 7*a* shows a plot of load (in N) versus displacement (in μm) for a cast zinc (Zn) sample. The arrow indicates pop-in.

FIG. 7*b* shows a plot of amplitude (in V) versus time (in s), showing raw acoustic data captured through a contact type transducer with the transducer attached to the sample (from FIG. 7*a*).

FIG. 7*c* shows a graph of frequency (in Hz; left vertical axis) and amplitude (right vertical axis) versus time (in s), for an acoustic signal from the sample of FIG. 7*a*.

FIG. 7*d* shows an enlarged version of the dotted box from FIG. 7*c*. The upper three arrows indicate long frequency range peaks, and the lower three arrows indicate short frequency range peaks.

FIG. 9*a* shows a plot of load (in N) versus displacement (in μm) for a cast tin (Sn) sample. The arrow indicates pop-in.

FIG. 9*b* shows a plot of amplitude (in V) versus time (in s), showing raw acoustic data captured through a contact type transducer with the transducer attached to the sample (from FIG. 9*a*).

FIG. 9*c* shows a graph of frequency (in Hz; left vertical axis) and amplitude (right vertical axis) versus time (in s), for an acoustic signal from the sample of FIG. 9*a*.

FIG. 9*d* shows an enlarged version of the dotted box from FIG. 9*c*. The peaks correspond to activation of deformation system during indentation.

FIG. 10*b* shows a plot of load (in N) versus displacement (in μm) obtained from a profilometry-based indentation plastometry (PIP) machine for the sample shown in FIG. 10*a*. The arrows indicate pop-in.

DETAILED DESCRIPTION

Figure 1:
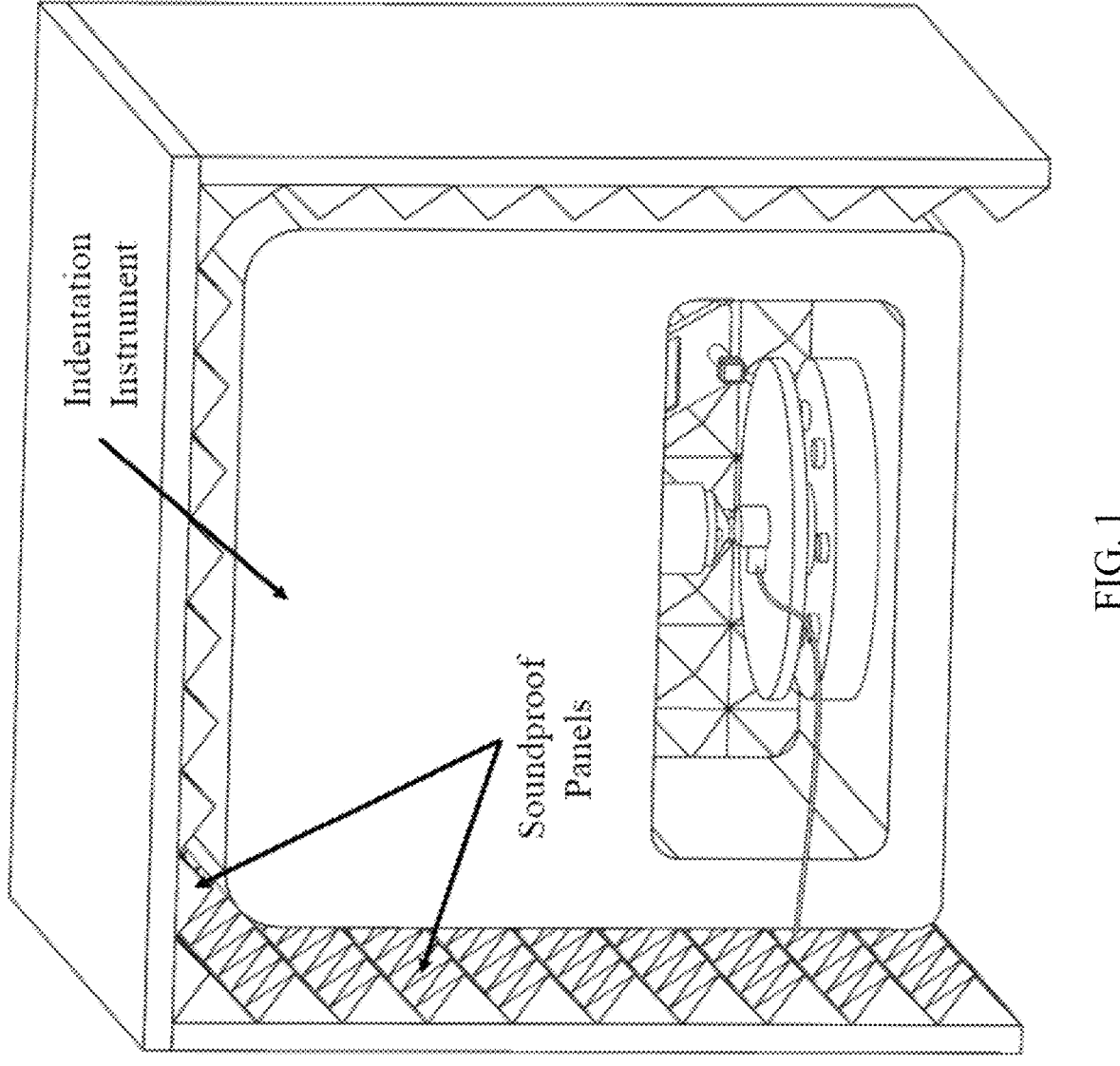
FIG. 1 shows indentation equipment inside a soundproof box, according to an embodiment of the subject invention.

Embodiments of the subject invention provide novel and advantageous systems and methods for acquisition of acoustic emission during indentation. An acoustic transducer can be used during indentation of a sample to acquire acoustic emission (AE) and capture valuable information concerning internal structural changes occurring within the material of the sample during the indentation process. This can help determine and/or understand the deformation characteristics and/or bulk plastic properties of the material of the sample. The transducer can be either a contact type acoustic transducer or a non-contact type acoustic transducer.

AE refers to the generation of transient elastic waves produced by the rapid release of energy within a material. These waves provide information about the internal changes in the material, such as plastic deformation mechanisms (e.g., dislocation glide, twinning, shear band formation, phase transformation, and/or cracking). Embodiments of the subject invention can provide real-time integration of an AE setup on an indentation system (e.g., an indentation plastometry system) to obtain valuable information about the deformation characteristics of a wide range of materials (e.g., metallic materials).

The profilometer-based indentation plastometry (PIP) technique offers a means to obtain the engineering stress-strain curve of metals and alloys through indentation. Embodiments of the subject invention provide integration of real-time acoustic signal acquisition during the indentation process to understand the material's deformation characteristics and bulk plastic properties. The real-time acquisition of AE during indentation of a sample, utilizing contact or non-contact type acoustic transducers, enables capturing valuable information concerning internal structural changes occurring within the material of the sample. The AE techniques of embodiments apply to a broad spectrum of materials (e.g., metallic materials), encompassing different crystal structures, including but not necessarily limited to cubic (e.g., body-centered cubic, face-centered cubic), tetragonal, and hexagonal packed structures. The utilization of real-time AE enables the capture of microstructural gradients within additively manufactured (AM) components, facilitating comprehensive analysis of their properties. In addition, AE offers the capability to provide crystallographic texture information. Further, monitoring AE during indentation assesses and maintains the health of the indentation motor of the indentation setup.

Embodiments of the subject invention provide an advancement in the indentation process with real-time AE acquisition and its application in various materials (e.g., metallic materials) and manufacturing processes. Embodiments can be used with any suitable sample material, including but not limited to titanium (Ti), zinc (Zn), tin (Sn), magnesium (Mg), aluminum (Al), iron (Fe), cadmium (Cd), indium (In), and any alloys thereof (e.g., AZ31).

Indentation plastometry systems can provide load-displacement characteristics. Inverse-finite element simulation can determine the true/engineering stress strain by aligning with the indentation profile. The incorporation of an AE setup aids with: capturing real-time material deformation by detecting the acoustic signal emitted during indentation; correlating load-displacement characteristics, such as pop-in on the underlying deformation mechanism (discrete burst of displacement during loading; this can sometimes be referred to as "twinning"); determining the threshold indentation load that triggers the initiation of deformation (e.g., twin, dislocation glide, shear banding), and/or phase transformation and/or cracking in the material; and characterizing a wide range of materials (e.g., metallic and/or composite materials). Material types that can be used include but are not limited to cubic systems (e.g., Fe and its alloys), hexagonal systems (e.g., Mg, Zn, Ti, Cd, and their alloys), tetragonal systems (e.g., Sn, In, and their alloys), bulk metallic glass (BMG) (e.g., $Zr_{44}Ti_{11}Cu_{10}Ni_{10}Be_{25}$), and composites (e.g., metal matrix composites with silicon and aluminum oxide dispersed in metals).

The inventors surprisingly discovered, while testing samples on a Plastometrex indentation system, that one or more distinct auditory signals emitted by a sample material during the PIP indentation process provides valuable information regarding the internal alterations transpiring within the material, which can be used to determine and/or understand the deformation characteristics and/or bulk plastic properties of the material of the sample. That is, the amalgamation of a real-time acoustic data acquisition system (e.g., in conjunction with the load-displacement obtained through the PIP technique) can be used to provide valuable information regarding the internal alterations transpiring within the material during the indentation process.

Embodiments of the subject invention provide AE acquisition during indentation (e.g., PIP indentation) of a sample, which can be used to assist in delineating the real-time deformation process. The indentation (e.g., PIP) technique can provide load-displacement and indent profiles. In addition, it can be used to deduce the stress-strain curve for selective metallic materials. However, the PIP indentation technique currently overlooks the underlying deformation mechanisms occurring during deformation. Detecting the instantaneous AE can provide valuable insights into the deformation mechanisms that transpire during indentation. The AE acquisition technique can extend to a wide range of metallic and non-metallic materials (e.g., polymers and their composites).

Referring to Examples 1-5, even though load-displacement data during indentation may reveal some information related to an internal change in the material, capturing AEs during this process yields valuable insights into the internal changes transpiring within the material. This additional information obtained through AE sheds light on the dynamics of the material's behavior during indentation and contributes to a comprehensive understanding of its internal deformation characteristics.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The Ti tested was manufactured through wire-arc additive manufacturing (WAAM). The Zn tested was processed through conventional casting, while the Sn and AZ31 alloy tested were extruded rods. Zn and Sn were procured from McMaster Carr, while the AZ31 alloy was procured from Amazon.

The PIP system was housed inside a soundproof box, as shown in FIG. 1. The acoustic insulation assisted in canceling noise during measurement. The acoustic signal emitted during indentation was captured through at least one non-contact transducer (in some tests) and/or at least one contact-type transducer (in other tests).

Figures 2A, 2B:
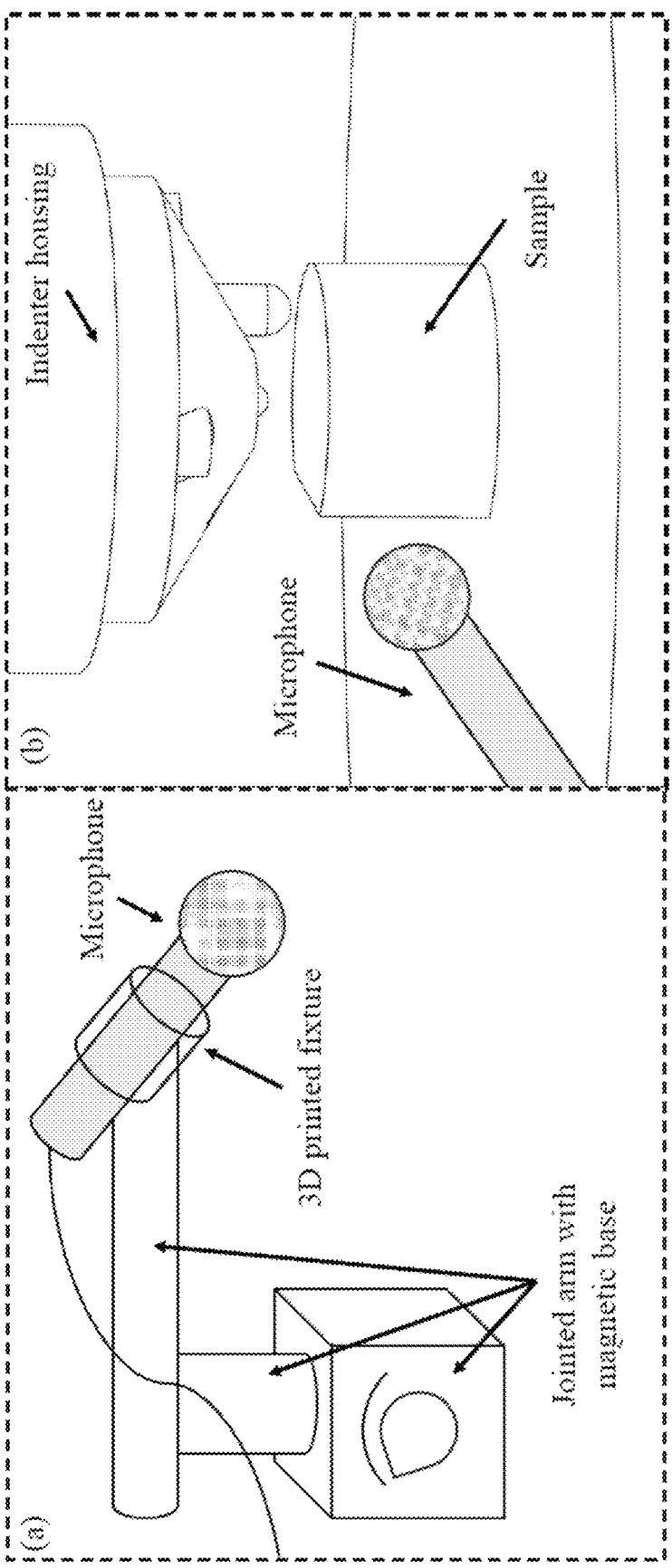
FIG. 2*a* shows a non-contact type transducer that can be used with indentation equipment, according to an embodiment of the subject invention.
FIG. 2*b* shows a non-contact type transducer together with an indenter housing and a sample, according to an embodiment of the subject invention.

The non-contact transducer used in testing was a low-noise microphone with part 378A04 obtained from PCB® Piezotronics, as shown in FIG. 2a. The microphone was securely mounted using a customized three-dimensional (3D) printed fixture on an economy jointed arm magnetic base indicator holder. The microphone was positioned close to the sample (about 25 mm from the indenter, as shown in FIG. 2b), ensuring it remained a safe distance from any moving parts of the machine.

Figures 3A, 3B, 3C:
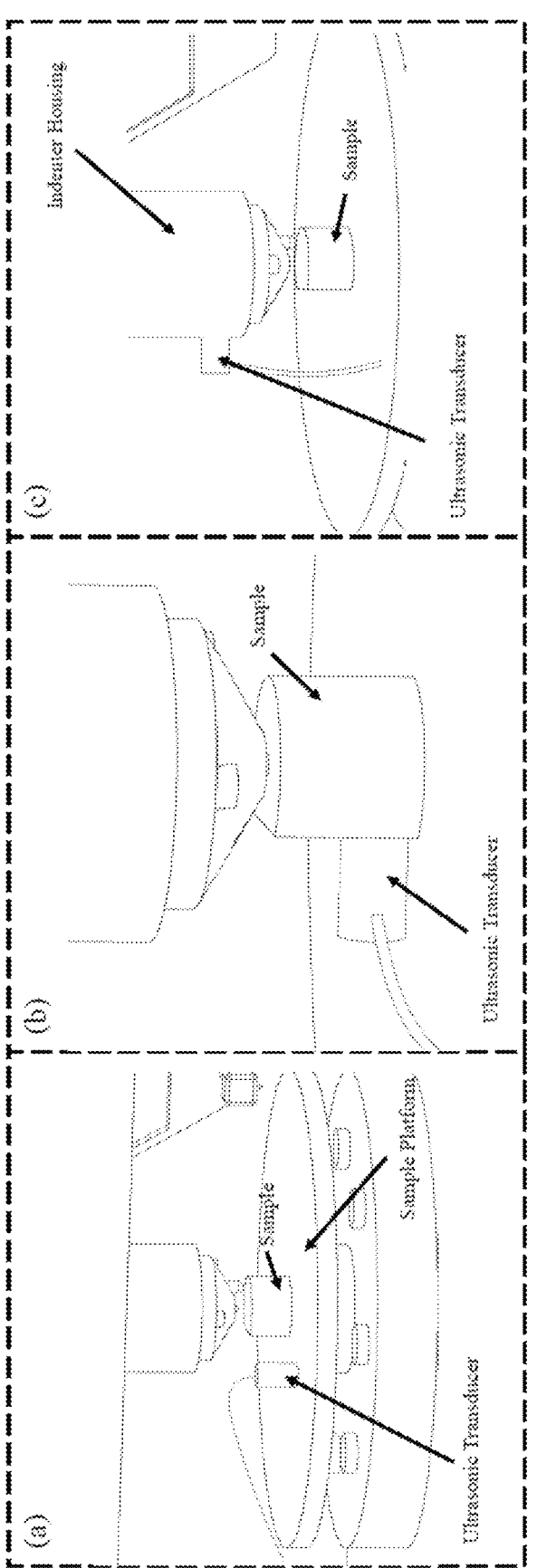
FIG. 3*a* a contact type transducer on a sample platform.
FIG. 3*b* shows a contact type transducer on a sample.
FIG. 3*c* shows a contact type transducer on an indenter housing, according to an embodiment of the subject invention.

The contact type transducer used in testing was procured from Olympus with the part number V133-RM with a maximum acquisition frequency of 2.25 megahertz (MHz). The contact-type transducer was positioned in three different ways: placed on the sample platform; attached to the sample; or affixed to the indenter housing. The visual representation of these three configurations is shown in FIGS. 3a, 3b, and 3c, respectively. The contact type transducer was fixed to the sample platform/sample/indenter housing using a high acoustic-impedance ultrasonic coupler procured from ECHO Ultrasonics with part number Echo Z Plus VHV-08, which ensured high signal transmission during indentation. FIGS. 3b and 3c show that an IRWIN Quick-grip clamp fixed the transducer to the sample or indenter housing.

Figure 4A:
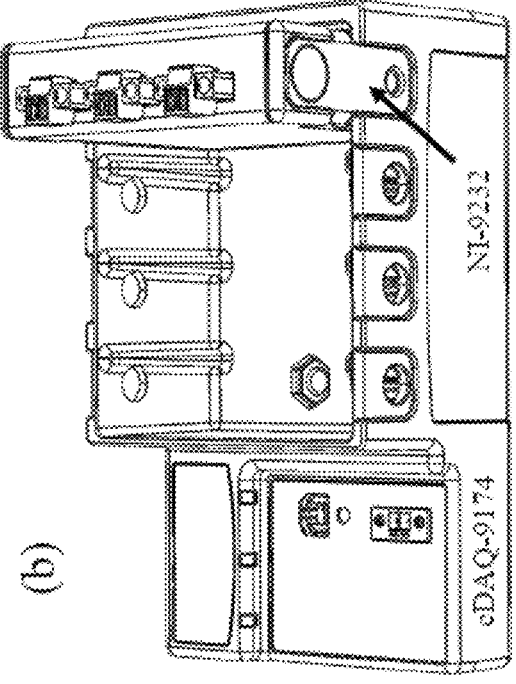
FIG. 4*a* shows a pre-amplifier.
Figure 4B:
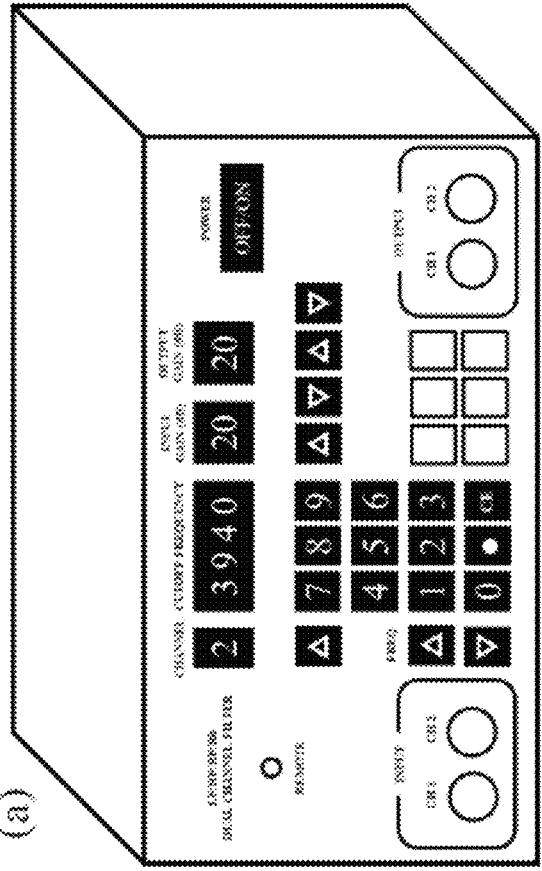
FIG. 4*b* shows a sound and vibration module (NI-9232) in compact data acquisition (cDAQ)-9174.

The acoustic signal obtained through non-contact or contact type was amplified using a programmable dual channel Butterworth/Bessel benchtop filter covering a cutoff frequency range from 3 hertz (Hz) to 2 MHz procured from Krohn Hite with model number 3940. The input and output gain was kept at 20 decibels (dB). FIG. 4a shows the instrument. Further, the amplified signals were acquired through a compact data acquisition (cDAQ) system. The cDAQ coupled with the C series sound and vibration input module was obtained from National Instruments with the model number cDAQ-9174, and the module was NI-9232. The cDAQ system and the corresponding input-output signals are shown in FIG. 4b. The real-time data was acquired through LabView2021 software from National Instruments. The acquired acoustic data were plotted using Origin-Pro®2023 Version from OriginLab.

Figure 5:
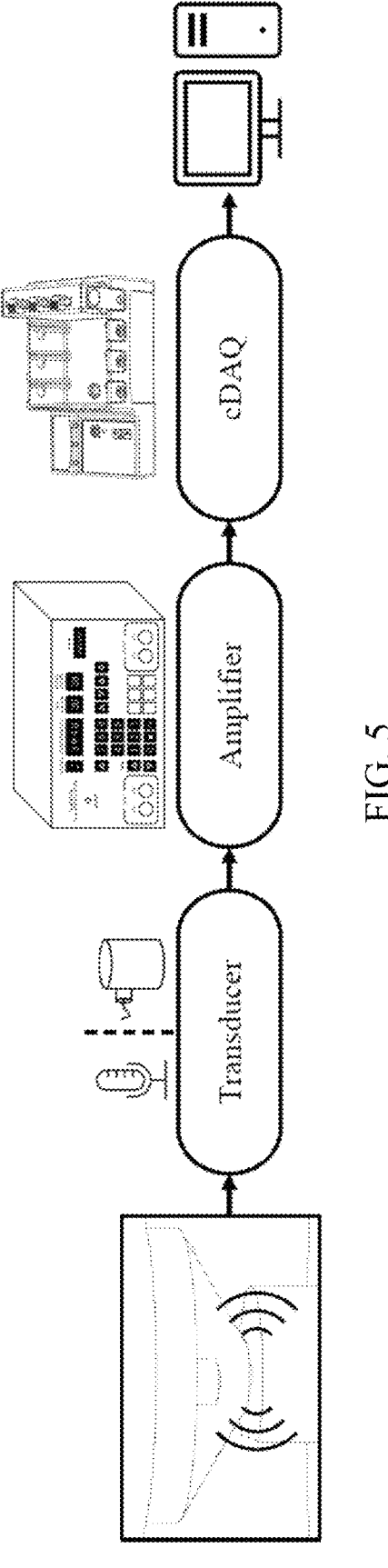
FIG. 5 shows a block diagram of an acoustic setup for indentation plastometry, according to an embodiment of the subject invention.

The block diagram in FIG. 5 illustrates the complete configuration of the acoustic sensing system used for testing. The acoustic signal emitting during indentation was detected by contact or non-contact-type transducers. These signals were subsequently amplified using an amplifier, and the amplified data was displayed on a computer through a data acquisition system. In order to demonstrate its feasibility, the system was utilized to conduct indentation tests on different materials: WAAM Ti; conventionally cast Zn; extruded Sn; and extruded Mg alloy (AZ31). All the indentation testing was conducted at a temperature of about 25° C.

Example 1—AE During Indentation in Ti

Figures 6A, 6B, 6C, 6D:
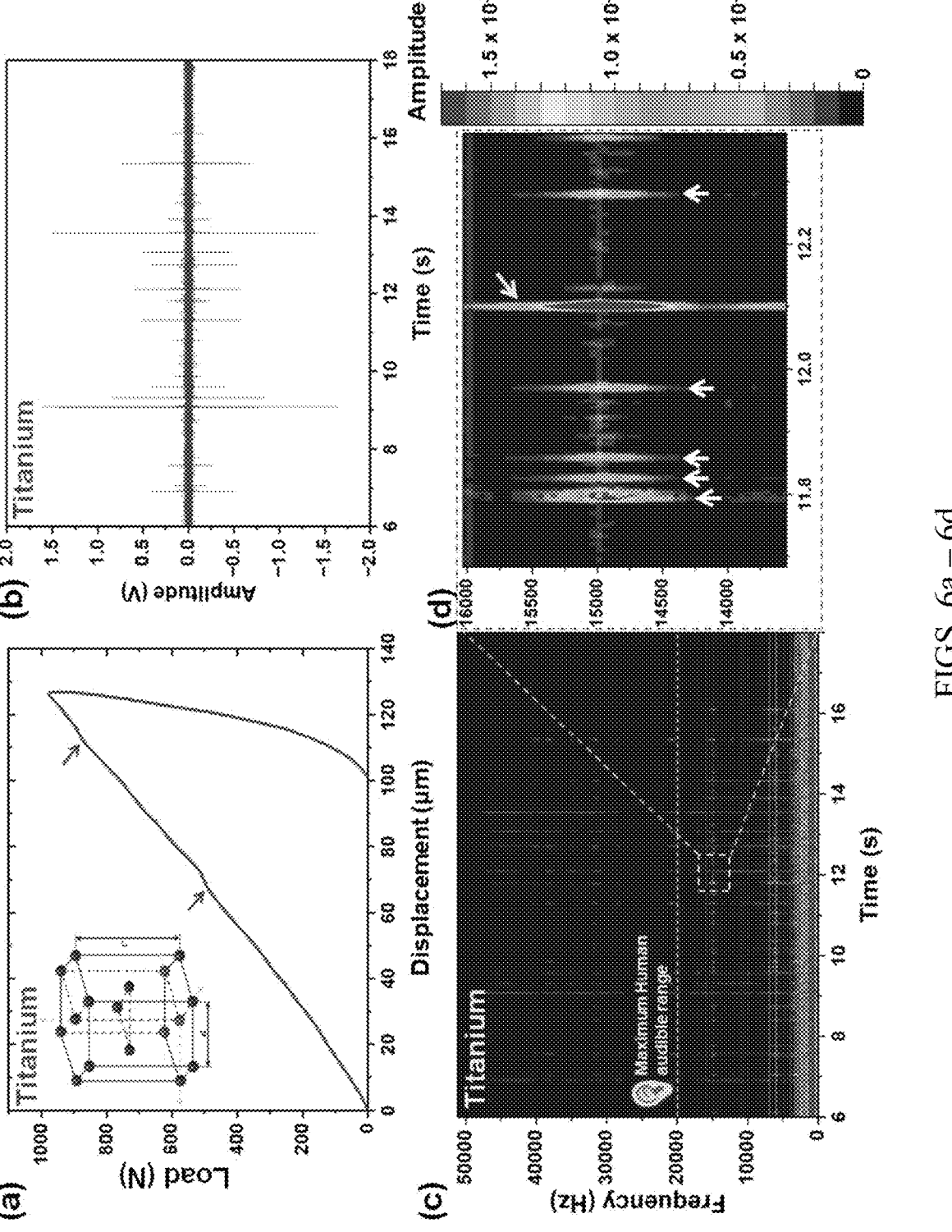

Ti has a hexagonal crystal structure as shown in the inset in FIG. 6a inset; the lattice parameter of the crystal structure a=0.295 nanometers (nm) with a c/a ratio (1.587) less than the ideal c/a ratio (1.63) of hexagonal closed-packed (HCP). The load displacement obtained during the indentation of the WAAM Ti sample is shown in FIG. 6a, which depicts the occurrence of pop-in phenomena (indicated by arrows in FIG. 6a). Pop-ins refer to a temporary decrease in load during indentation. Generally, the pop-in phenomenon is typically associated with the material's dislocation glide, or shear band formation, or deformation twins, or phase transformation, or cracking. Although two pop-ins are noticed in the load-displacement diagram, the acoustic signals in FIG. 6b indicate a relatively large number of peaks. These peaks correspond to AEs resulting from internal changes in the material. This suggests AE provides more comprehensive information than a simple load-displacement diagram. It can be noted that the maximum intensity of the acoustic signal is approximately 1.5 Volts (V).

FIG. 6c illustrates that the emitted acoustic signals encompass a broad range of frequencies, exceeding the human maximum audible range of 20,000 Hz. The magnified image in FIG. 6d indicates a longer peak (indicated by the higher arrow) and a series of shorter frequency peaks (indicated by the five lower arrows), which have a range of amplitude; and these peaks correspond to internal changes such as twin and dislocations glide generated during indentation.

Example 2—AE During Indentation in Zn

Figures 7A, 7B, 7C, 7D:
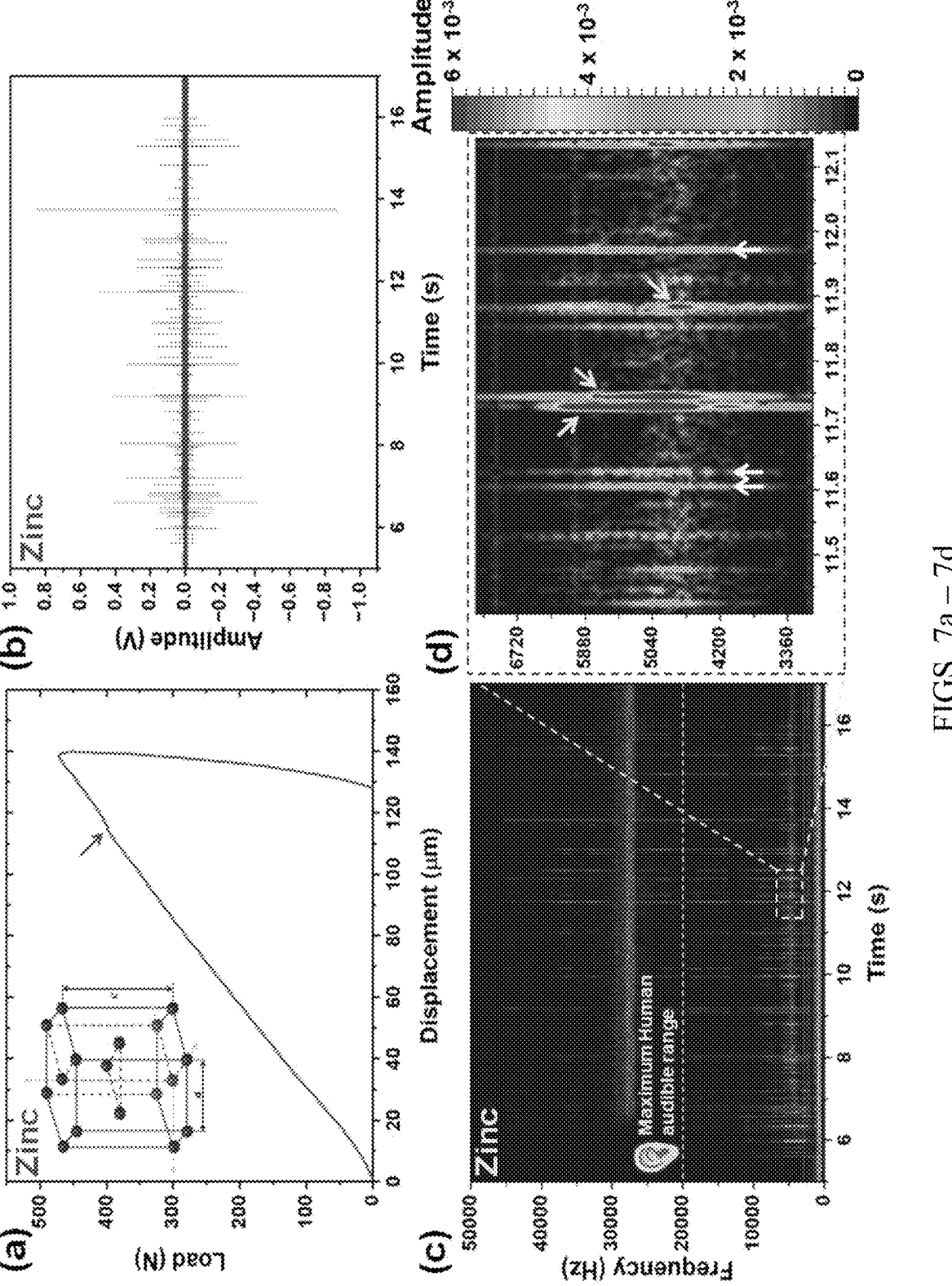

Similar to Ti, Zn has a hexagonal crystal structure but has a higher c/a ratio (1.856) compared to the ideal c/a ratio of the HCP structure. The inset of FIG. 7a shows the structure of Zn, with a lattice parameter a=0.266 nm. FIG. 7a illustrates the load-displacement curve of cast Zn, revealing the presence of pop-in characteristics as indicated by an arrow. Notably, the pop-in characteristics in cast Zn are relatively lower than that observed in Ti. However, the acoustic data (FIG. 7b) shows a higher number of peaks, with the maximum intensity of the peak reaching 0.8 V. Similar to the Ti case, the frequency range data shown in FIG. 7c has a frequency higher than the audible range. Also, from the magnified frequency range data in FIG. 7d, it is evident that the observed peaks exhibit varying ranges of frequency and amplitude.

Example 3—AE During Indentation in AZ31

Figures 8A, 8B, 8C, 8D:
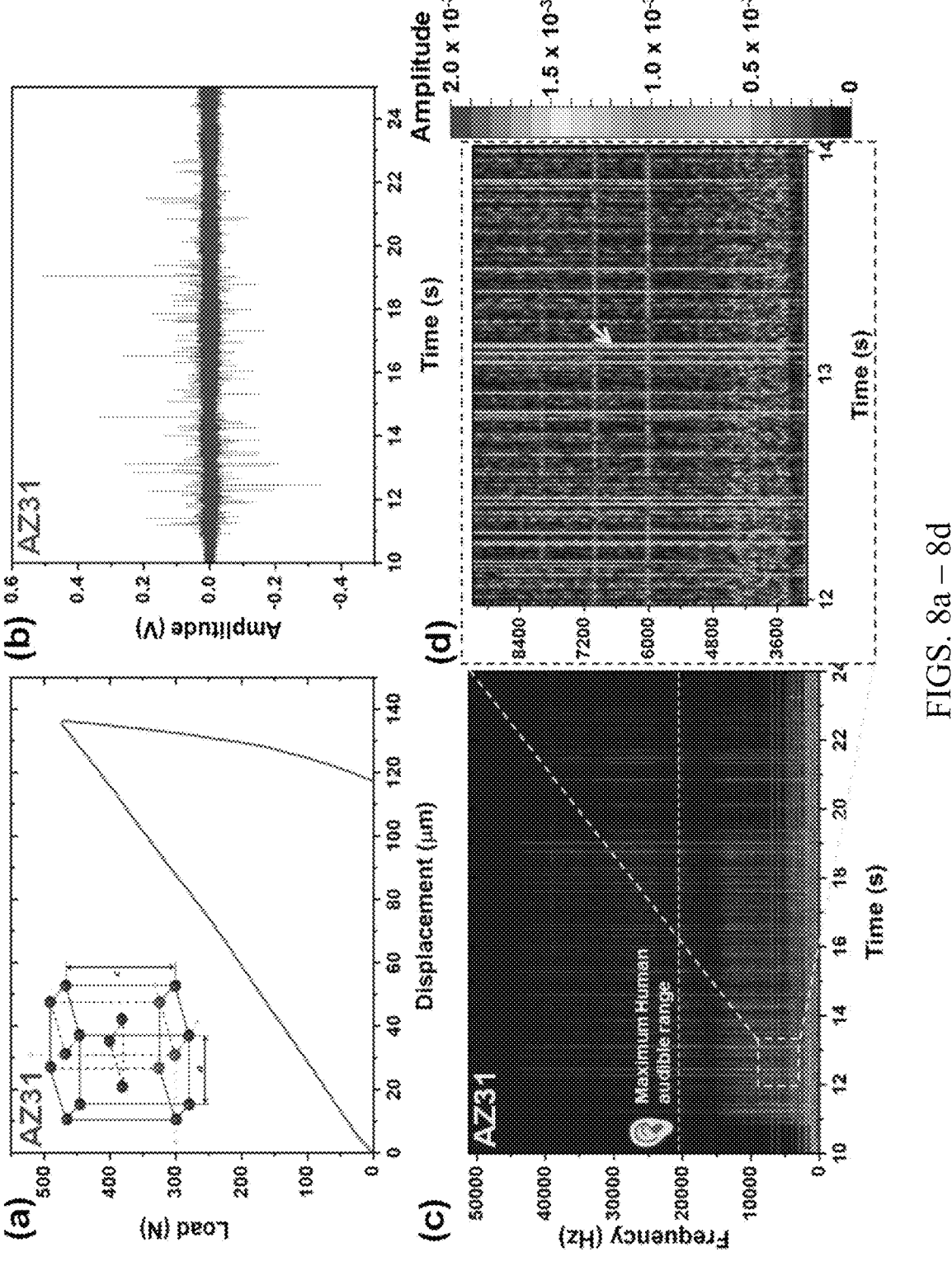
FIG. 8*a* shows a plot of load (in N) versus displacement (in μm) for an extruded magnesium-aluminum alloy (AZ31 alloy) sample.
FIG. 8*b* shows a plot of amplitude (in V) versus time (in s), showing raw acoustic data captured through a contact type transducer with the transducer attached to the sample (from FIG. 8*a*).
FIG. 8*c* shows a graph of frequency (in Hz; left vertical axis) and amplitude (right vertical axis) versus time (in s), for an acoustic signal from the sample of FIG. 8*a*.
FIG. 8*d* shows an enlarged version of the dotted box from FIG. 8*c*. The arrow indicates a long frequency range peak.

A Z31 is a Mg alloy typically containing about 3% Al and about 1% Zn (in weight percentages) as alloying elements. AZ31 alloy is widely used in the automobile and aviation industries. AZ31 exhibits a hexagonal-packed crystal structure similar to Ti and Zn. However, the c/a ratio (1.624) of AZ31 is close to the ideal c/a ratio (1.63). The crystal structure of AZ31 alloy is depicted in the inset in FIG. 8a, with a lattice parameter a=0.32 nm. Unlike Ti and Zn, the load-displacement diagram in FIG. 8a does not display pop-in characteristics. However, FIG. 8b presents acoustic data indicating a series of acoustic emissions occurring during indentation, with the maximum emitted signal being approximately 0.5 V. The corresponding frequency range data in FIG. 8c reveals that the frequency of the emitted signal surpasses the audible range (as indicated in FIG. 8c). Moreover, the magnified image in FIG. 8d shows the frequency range data with varying amplitude, forming a series of parallel lines.

Example 4—AE During Indentation in Sn

Figures 9A, 9B, 9C, 9D:
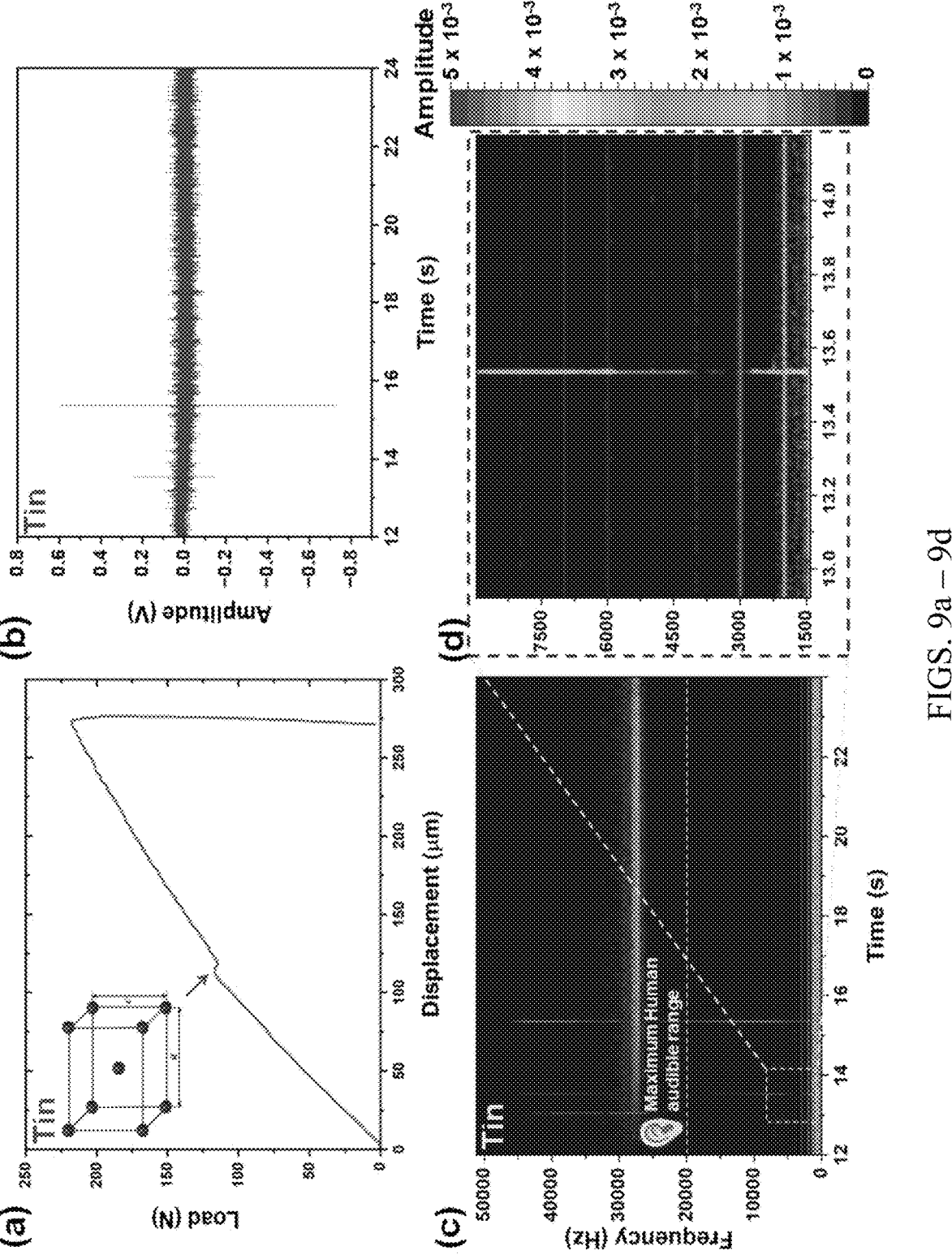

In contrast to Ti, Zn, and AZ31, Sn possesses a distinctive crystal structure known as a body-centered tetragonal, as shown in the inset of FIG. 9a. The lattice parameter of Sn is a=0.582 nm with a c/a ratio of 0.545. Similar to Ti and Zn, the load-displacement diagram (FIG. 9a) reveals the presence of pop-in characteristics while the acoustic data show fewer peaks (FIG. 9b) than Ti and Zn. The maximum intensity of the single from the acoustic transducer reaches 0.6 V. The frequency plot (FIG. 9c) confirms that the emitted frequency during indentation surpasses the audible range. Although smaller peaks were not visible in this case (as shown in the magnified image in FIG. 9d), the large peak corresponds to deformation during indentation.

Figure 10A:
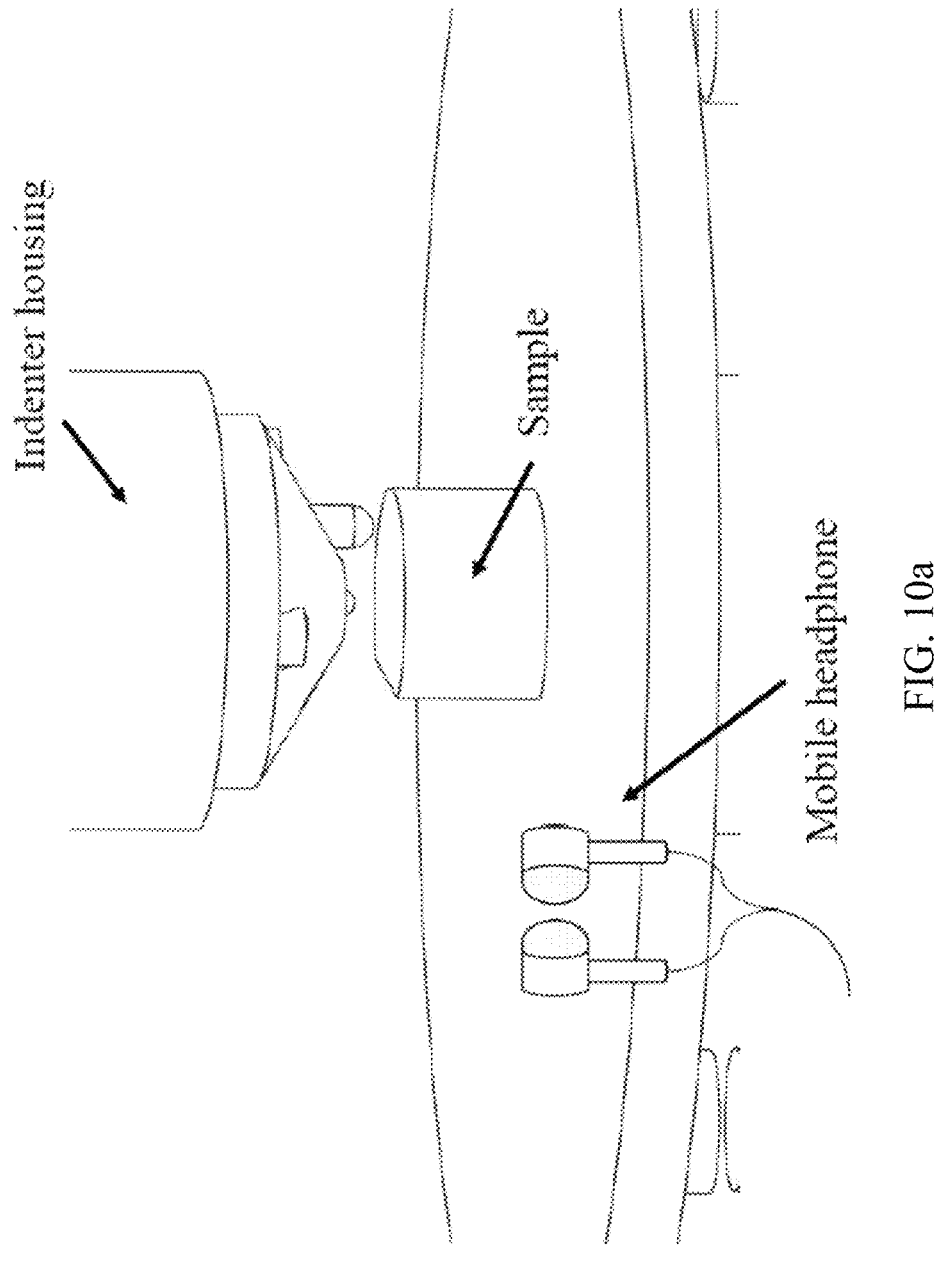
FIG. 10*a* shows an indenter housing along with an earphone.
Figure 10B:
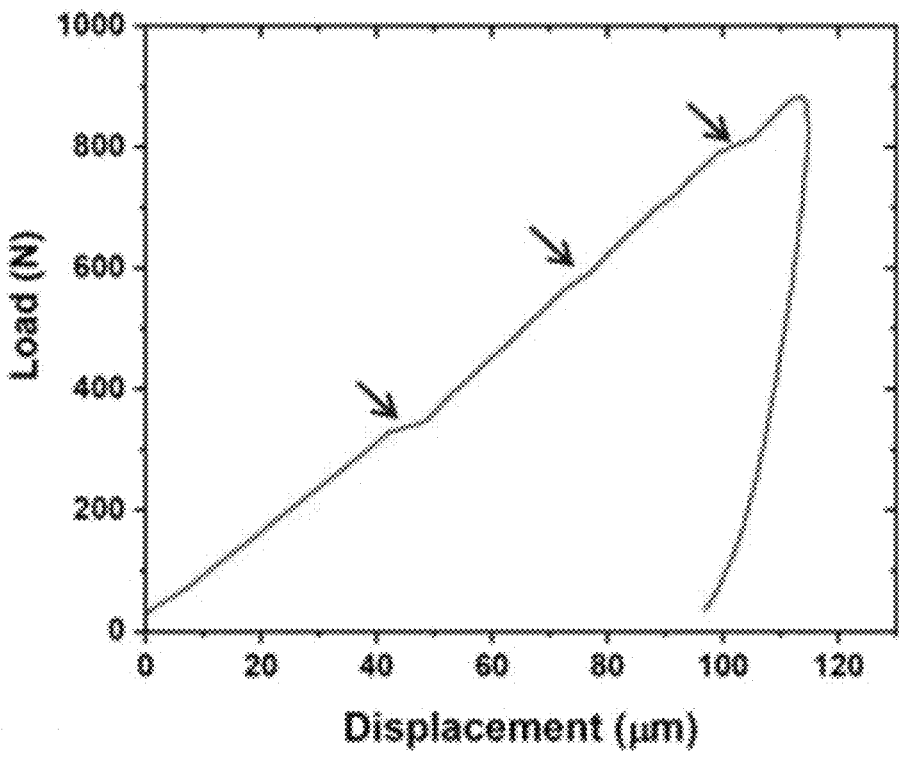
Figure 10C:
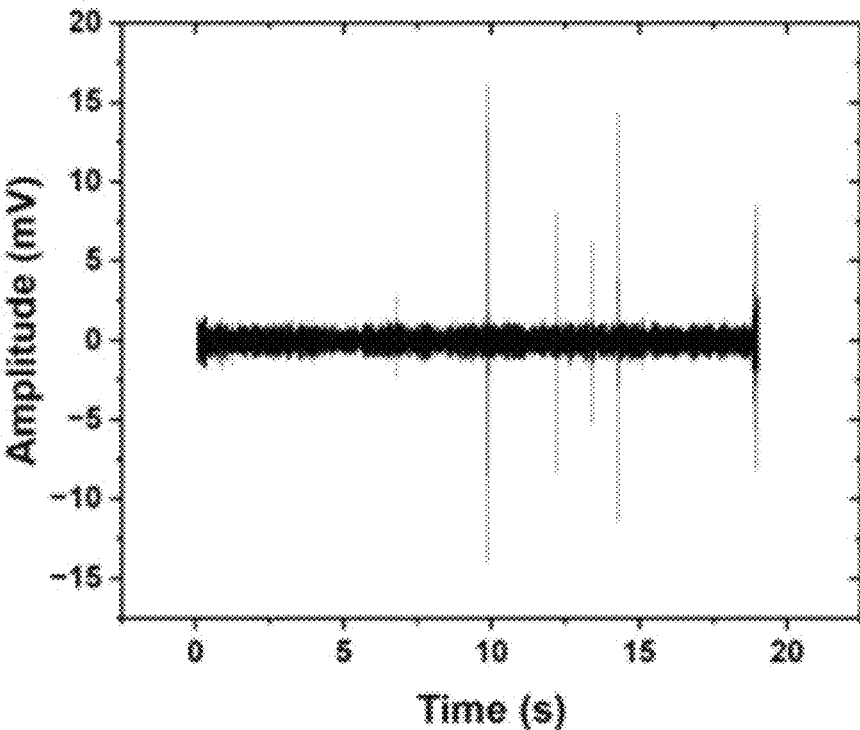
FIG. 10*c* shows a plot of amplitude (in V) versus time (in s), showing acoustic peaks for the sample from FIGS. 10*a* and 10*b*, captured through the earphone.

Example 5—AE During Indentation in Ti Using a Headphone as the Acoustic Transducer A WAAM Ti was tested using a mobile headphone as the acoustic transducer. The setup is shown in FIG. 10a). The identified sound signals aligned with the pop-in phenomenon observed in the load-displacement curve, as illustrated in FIGS. 10b and 10c.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for acquisition of acoustic emission (AE) of a sample during indentation, the system comprising:
   an indenter device comprising an indenter and a sample platform configured to have the sample disposed thereon; and
   an acoustic transducer disposed proximate to the sample platform and configured to acquire AE in real time from the sample during indentation of the sample by the indenter device,
   the acoustic transducer being a non-contact type acoustic transducer configured to acquire the AE from the sample without being in physical contact with the sample or the sample platform.

2. The system according to claim 1, the acoustic transducer comprising at least one of an ultrasonic transducer, a microphone, and a headphone.

3. The system according to claim 1, the acoustic transducer being a contact type acoustic transducer configured to acquire the AE from the sample while being in physical contact with at least one of the sample and the sample platform.

4. The system according to claim 1, the sample comprising a metallic material, a ceramic material, or a polymer-based material.

5. The system according to claim 1, further comprising a data acquisition system in operable communication with the acoustic transducer and configured to analyze the AE and generate AE data based on the AE.

6. The system according to claim 5, further comprising a display in operable communication with the data acquisition system and configured to display the AE data.

7. The system according to claim 1, further comprising a display in operable communication with the acoustic transducer and configured to display AE data based on the AE.

8. The system according to claim 1, further comprising a soundproof box, the indenter device and the acoustic transducer being disposed within the soundproof box.

9. The system according to claim 1, the indenter device being a profilometer- based indentation plastometry (PIP) indenter device.

10. A method for acquiring acoustic emission (AE) of a sample during indentation, the method comprising:

providing a system comprising an indenter device and an acoustic transducer disposed proximate to a sample platform of the indenter device;

disposing the sample on the sample platform of the indenter device;

operating the indenter device such that an indenter of the indenter device indents the sample; and acquiring AE in real time from the sample, using the acoustic transducer, during the indenting of the sample, the acoustic transducer being a non-contact type acoustic transducer, and the acoustic transducer acquiring the AE from the sample without being in physical contact with the sample or the sample platform during the indenting of the sample.

11. The method according to claim 10, the acoustic transducer comprising at least one of an ultrasonic transducer, a microphone, and a headphone.

12. The method according to claim 10, the acoustic transducer being a contact type acoustic transducer, and the acoustic transducer acquiring the AE from the sample while being in physical contact, during the indenting of the sample, with at least one of the sample, the sample platform, and an indenter housing.

13. The method according to claim 10, the sample comprising a metallic material, a ceramic material, or a polymer-based material.

14. The method according to claim 10, further comprising:

providing a data acquisition system in operable communication with the acoustic transducer;

providing a display in operable communication with the data acquisition system;

analyzing the AE using the data acquisition system;

generating the AE data based on the AE using the data acquisition system; and displaying the AE data on the display.

15. The method according to claim 10, further comprising disposing the indenter device and the acoustic transducer in a soundproof box, the operating of the indenter device and the acquiring of the AE being performed while the indenter device and the acoustic transducer are in the soundproof box.

16. The method according to claim 10, the indenter device being a profilometer- based indentation plastometry (PIP) indenter device.

17. A system for acquisition of acoustic emission (AE) of a sample during indentation, the system comprising:

an indenter device comprising an indenter and a sample platform configured to have the sample disposed thereon;

an acoustic transducer disposed proximate to the sample platform and configured to acquire AE in real time from the sample during indentation of the sample by the indenter device;

a data acquisition system in operable communication with the acoustic transducer and configured to analyze the AE and generate AE data based on the AE;

a display in operable communication with the data acquisition system and configured to display the AE data; and a soundproof box, the indenter device and the acoustic transducer being disposed within the soundproof box, the sample comprising a metallic material, a ceramic material, or a polymer-based material, the indenter device being a profilometer-based indentation plastometry (PIP) indenter device, and the acoustic transducer being either:

a) a non-contact type acoustic transducer configured to acquire the AE from the sample without being in physical contact with the sample or the sample platform; or b) a contact type acoustic transducer configured to acquire the AE from the sample while being in physical contact with at least one of the sample, the sample platform, and an indenter housing.

18. A method for acquiring acoustic emission (AE) of a sample during indentation, the method comprising:

providing the system according to claim 17;

disposing the sample on the sample platform of the indenter device;

disposing the indenter device and the acoustic transducer in the soundproof box;

operating the indenter device such that the indenter of the indenter device indents the sample;

acquiring AE in real time from the sample, using the acoustic transducer, during the indenting of the sample;

analyzing the AE using the data acquisition system;

generating the AE data based on the AE using the data acquisition system; and displaying the AE data on the display.

* * * * *